No. 678,512. Patented July 16, 1901.
D. P. PERRY.
STORAGE BATTERY.
(Application filed May 7, 1900.)
(No Model.)
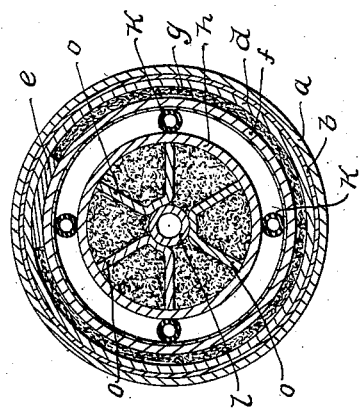
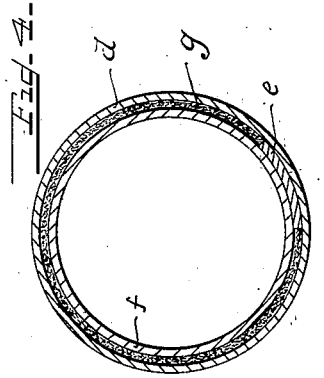
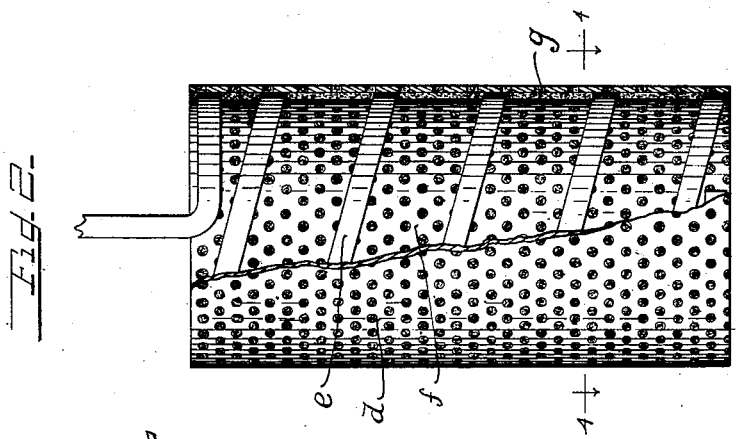
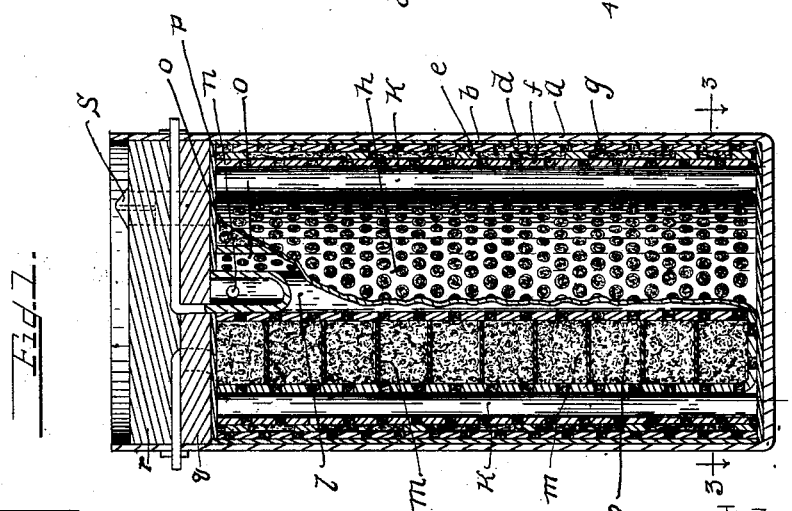
Witnesses
Max W. Zabel.
Harvey L. Hanson.
Inventor
David P. Perry
By Charles A. Brown & Craft
Attorneys
THE NORRIS PETERS CO., PHOTO-LITHO., WASHINGTON, D. C.

UNITED STATES PATENT OFFICE.

DAVID P. PERRY, OF CHICAGO, ILLINOIS.

STORAGE BATTERY.

SPECIFICATION forming part of Letters Patent No. 678,512, dated July 16, 1901.

Application filed May 7, 1900. Serial No. 15,823. (No model.)

*To all whom it may concern:*

Be it known that I, DAVID P. PERRY, a citizen of the United States, residing at Chicago, in the county of Cook and State of Illinois, have invented a certain new and useful Improvement in Storage Batteries, (Case No. 4,) of which the following is a full, clear, concise, and exact description, reference being had to the accompanying drawings, forming a part of this specification.

My invention relates to storage batteries, and has for its object the provision of improved positive and negative elements thereof in which most efficient action can be secured within a minimum space and by which the stored electricity may be efficiently conducted from the battery.

Generally speaking, one battery element may be constructed of a conductor upon which a layer of active material is placed and a terminal conductor extending from side to side of the conductor and embedded within the said active material, the said conductor being preferably united to the battery-conductor at intervals, whereby current is taken from the conductor at different portions thereof. In the preferred embodiment of this element the conductor is in the form of a tube and the conducting terminal in the form of a helix surrounding the tube, a second cylindrical conductor preferably inclosing the aforesaid conductor and the helical terminal. Active material is confined between the turns of the helical terminal and is also confined within apertures in the plates. The helical terminal conductor is preferably integral with the terminal proper, which forms a continuation thereof projected beyond the terminal. The element thus described is preferably the negative element of the battery. I also construct the battery element with layers or bodies of active material, that are separated by a fluid-conducting porous material, preferably asbestos, whereby the electrolyte is conveyed to the interior portions of the active material, whereby increased action of the electrolyte is secured within comparatively small space.

In the preferred embodiment of the invention the active material forming a part of this element is built up in superposed layers separated by the fluid-conducting material that is preferably in contact with the active material adjacent thereto, a perforated leaden jacket preferably surrounding the active material. The perforations in the leaden jacket are also filled with the active material, except at the places where the asbestos is located, to permit the electrolyte to have access to the asbestos. The element thus described constitutes, preferably, the positive element of the battery and is surrounded by the aforesaid negative element, an annular space preferably intervening between the battery elements, in which the electrolyte is disposed. To further improve the construction of the positive element, I provide radiating ribs of perforated lead, which are preferably joined at their inner ends to a tubular terminal conductor extending lengthwise of the positive element and at their outer ends to the tubular plate.

I will explain my invention more fully by reference to the accompanying drawings, illustrating the preferred embodiment thereof, in which—

Figure 1 is an elevation in section, with conductor broken away, of a battery constructed in accordance with the invention. Fig. 2 is an elevation of one of the battery elements with parts broken away to show its construction. Fig. 3 is a plan view on line 3 3 of Fig. 1. Fig. 4 is a section plan view on line 4 4 of Fig. 2.

Like parts are indicated by similar characters of reference throughout the different figures.

The battery-casing $a$, constructed of suitable material, is provided with a vertical lining $b$, preferably asbestos. A perforated leaden conductor $d$ has intimate contact with the vertical lining of asbestos or other suitable fluid-conducting material, and this conductor in turn has intimate contact with a helically-disposed terminal $e$, that surrounds the second perforated leaden conductor $f$. The terminal element $e$ is preferably burned to the conductor $f$ at intervals to collect current at different portions of the conductor. In manufacturing this battery element the inclosing leaden conductor $d$ may be unsecured to the helical rib $e$. The conductors $d$ and $f$ are perforated, and active material $g$ is interposed between these conductors and is contained within the perforations. The element thus described constitutes the negative element of the battery, which is thus tubular in form.

The positive element of the battery preferably comprises a perforated tubular conductor $h$, of lead, inclosed by the negative element, an annular space intervening between the conductor $h$ and the negative element for containing the electrolyte, a plurality of tubes $k$, of insulating material, vertically disposed within this annular space, serving to maintain the battery elements apart. The positive element of the battery is preferably provided with a leaden terminal tube $l$, that extends lengthwise through the same, active material being disposed between the tubular terminal and the surrounding tubular conductor. In order that the electrolyte in the annular space around the positive element may find access to the inner portions of the active material, layers of porous fluid-conducting material $m$, preferably asbestos, are provided about the tubular terminal, these layers of asbestos dividing the active material into layers, which preferably have intimate contact with the separating layers of asbestos. The active material inclosed by the tubular conductor $h$ is also preferably contained in perforations provided in said tubular conductor. The terminal tube of the positive element is provided with perforations $n$ for conveying the electrolyte. I preferably provide radiating ribs $o$, intervening between the central terminal tube and the outer tube, the layers of fluid-conducting material being inserted between these ribs. After the battery parts have been assembled layers of asbestos $p$ are preferably put on top of these parts, after which a layer $q$ of rubber is placed on top of the asbestos, this rubber being provided with holes, through which the terminals of the battery elements extend, these terminals being bent at right angles and passing through the containing-casing $a$. Finally a layer $r$ of wax or some suitable cementing material serves to seal the casing $a$. A plug $s$ partially closes a passage having communication with the annular space between the battery elements, this plug being provided with a small vent-hole to pass off gas that may generate in the action of the battery.

While I have herein shown and particularly described the preferred embodiment of my invention, I do not wish to be limited to the precise construction shown, as modifications may be readily made without departing from the spirit thereof; but,

Having thus described my invention, I claim as new and desire to secure by Letters Patent—

1. A storage battery having one of its elements composed of a metal conductor, active material, and fluid-conducting material dividing the active material into layers and serving to convey electrolyte between the layers of active material, said conductor being tubular and inclosing the active material, substantially as described.

2. A storage battery having one of its elements composed of a perforated metal conductor, active material and fluid-conducting material dividing the active material into layers and serving to convey electrolyte between the layers of active material, said conductor being tubular and inclosing the active material, the said active material filling the perforations, except where the fluid-conducting material is located, substantially as described.

3. A storage battery having one of its elements composed of a metal conductor, active material and fluid-conducting material dividing the active material into layers and serving to convey electrolyte between the layers of active material, said conductor being tubular and inclosing the active material, and the terminal passing centrally through the battery element, substantially as described.

4. A storage battery having one of its elements composed of a metal conductor, active material and fluid-conducting material dividing the active material into layers and serving to convey electrolyte between the layers of active material, said conductor being tubular and inclosing the active material, and the tubular terminal passing centrally through the battery element, substantially as described.

5. A storage battery having one of its elements composed of a metal conductor, active material and fluid-conducting material dividing the active material into layers and serving to convey electrolyte between the layers of active material, said conductor being tubular and inclosing the active material, and perforated ribs of metal inclosed by the tubular conductor, substantially as described.

6. A storage battery having one of its elements composed of a tubular conductor, active material carried by the conductor, a terminal conductor helically arranged about said tubular conductor, embedded within the active material and engaging the tubular conductor at different points in its length, substantially as described.

7. A storage battery having one of its elements composed of a tubular conductor, active material, and a terminal conductor helically arranged about the said tubular conductor and engaging the tubular conductor at different points in its length, substantially as described.

8. A storage battery having one of its elements composed of a perforated tubular conductor, active material, and a terminal conductor helically arranged about the said perforated tubular conductor and engaging the perforated tubular conductor at different points in its length, substantially as described.

9. A storage battery having one of its elements composed of a perforated tubular conductor, active material, and a terminal conductor helically arranged about the said perforated tubular conductor and engaging the perforated tubular conductor at different points in its length, and an additional perforated cylindrical conductor inclosing the aforesaid tubular conductor and the terminal conductor, the active material being confined between the said conductors, substantially as described.

In witness whereof I hereunto subscribe my name this 2d day of May, A. D. 1900.

DAVID P. PERRY.

Witnesses:
MAX W. ZABEL,
GEORGE L. CRAGG.